US012572125B2

(12) United States Patent
Romo Torres

(10) Patent No.: US 12,572,125 B2
(45) Date of Patent: Mar. 10, 2026

(54) SAFETY POWER MANAGEMENT

(71) Applicant: NXP USA, Inc., Austin, TX (US)

(72) Inventor: Joaquin Alberto Romo Torres, Chandler, AZ (US)

(73) Assignee: NXP USA, Inc., Austin, TX (US)

(*) Notice: Subject to any disclaimer, the term of this patent is extended or adjusted under 35 U.S.C. 154(b) by 791 days.

(21) Appl. No.: 17/984,995

(22) Filed: Nov. 10, 2022

(65) Prior Publication Data

US 2024/0160176 A1 May 16, 2024

(51) Int. Cl.
*G05B 19/048* (2006.01)

(52) U.S. Cl.
CPC .................................. *G05B 19/048* (2013.01)

(58) Field of Classification Search
CPC ............... G05B 19/048; G06F 11/0757; G06F 11/1004; B60L 3/00; B60R 16/0231; B60R 16/03
See application file for complete search history.

(56) References Cited

U.S. PATENT DOCUMENTS 9,638,744 B2 * 5/2017 Bernon-Enjalbert ........................ G01R 31/3187
9,929,556 B2 * 3/2018 Poletto ................. H02H 7/0851
2008/0215883 A1 * 9/2008 Fok ....................... H04W 12/06 713/167
2015/0331040 A1 * 11/2015 Bernon-Enjalbert ... G06F 30/30 438/424
2022/0292228 A1 * 9/2022 Johnson ................ G06F 21/602

FOREIGN PATENT DOCUMENTS

WO WO-2016020640 A1 2/2016

OTHER PUBLICATIONS

NXP, "VR5510 Multi-Output PMIC with SMPS and LDO", Rev. 4-6 Product Datasheet, Oct. 2021, 193 pgs.
Renesas, "RAA271005; General Purpose IC for Power Management Automotive Applications", Rev. 1.00, Short-Form Datasheet, Sep. 27, 2021, 13 pgs.

* cited by examiner

*Primary Examiner* — Zhipeng Wang

(57) ABSTRACT

Provided is a safety power management system that includes a main digital control unit configured to control one or more system power supplies. In addition, a digital machine supervisor is configured to execute a handshake procedure in which it: (a) sends handshake requests to the main digital control unit at predetermined times, (b) waits for a response signal from the main digital control unit to each of the handshake requests, (c) performs a verification process on the response signal if the response signal is received within an expected timeframe, and (d) outputs a DMS safety signal if the response signal is not received within the expected timeframe or if the verification process fails. The main digital control unit also is configured to output a DCU safety signal if one of the handshake requests is not received at any one of the predetermined times.

20 Claims, 9 Drawing Sheets

SAFETY POWER MANAGEMENT

FIELD OF THE INVENTION

The present invention pertains, among other things, to systems, methods and techniques for power management within electronic systems, and it is applicable, e.g., to managing power relative to safety concerns in more efficient ways, such as power management in a safety-related automotive or industrial context.

BACKGROUND

The following discussion concerns certain background information related to the present invention. However, it should be understood that only knowledge clearly, explicitly and specifically described herein as being "conventional" or "prior art" is intended to be characterized as such. Everything else should be understood as knowledge and/or insight originating from the present inventor.

It often is desirable to implement power management within electronic systems in a manner that provides safety features, e.g., in an attempt to prevent situations (e.g., higher or lower than expected voltages) that otherwise could cause significant damage to the subject circuitry, damage beyond that particular circuitry, or in some cases, even personal injury. For example, such power management often is very important within automotive electrical and electronic systems, especially as electric and self-driving cars become more prevalent. A conventional architecture for addressing safety concerns utilizes a dedicated, full-featured state machine with physical "isolation" and full independence from the main functional components. New and nonobvious improvements to such conventional architectures are now discussed.

SUMMARY OF THE INVENTION

In one respect, the present invention addresses logic integrity failures in a safety power management integrated circuit by utilizing a handshake procedure between a main digital control unit and a separate digital machine supervisor, where either can provide a safety signal in the event a problem is detected.

One particular embodiment of the invention is directed to a safety power management system that includes a main digital control unit configured to control a system power supply (e.g., one or more system power supplies along with relevant system monitoring circuits). In addition, a digital machine supervisor is configured to execute a handshake procedure in which it: (a) sends handshake requests to the main digital control unit at predetermined times, (b) waits for a response signal from the main digital control unit to each of the handshake requests, (c) performs a verification process on the response signal if the response signal is received within an expected timeframe, and (d) outputs a DMS safety signal if the response signal is not received within the expected timeframe or if the verification process fails. The main digital control unit is configured to generate and provide the response signal in response to each of the handshake requests and to output a DCU safety signal if one of the handshake requests is not received at any one of the predetermined times.

Certain more-specific implementations of the foregoing embodiment(s) include one or more of the following features.

The digital machine supervisor executes the handshake procedure based on a first clock signal, and the main digital control unit executes a process to respond to the handshake requests based on a second clock signal that is independent of the first clock signal (e.g., to ensure clocking independence).

The digital machine supervisor is powered by a first power supply, and the main digital control unit is powered by a second power supply that is independent of the first power supply (e.g., to ensure circuit supply independence).

The safety power management system also includes a separate monitoring unit, configured to monitor operations of the system power supply.

The separate monitoring unit provides notifications directly to the digital machine supervisor.

The separate monitoring unit includes an overvoltage monitor.

The system power supply supplies electrical power to an automotive system.

Each of the digital machine supervisor and the main digital control unit can instigate the transmission of a system safety output signal to a component of the automotive system.

The system safety output signal is a fail-safe notification.

The system safety output signal is a hard reset signal.

The digital machine supervisor has an output coupled to the system power supply and is configured to directly disable the system power supply upon occurrence of a critical system failure.

Each of the handshake requests comprises a randomly generated code.

Prior to execution of the handshake procedure, the main digital control unit provides the digital machine supervisor with a reference code representing values of control signals intended to be used by the main digital control unit (e.g., to control safety-related analog voltage monitoring blocks).

The main digital control unit generates the response signal in response to each of the handshake requests based on then-current values of the control signals being used by the main digital control unit (and, in certain embodiments, DMS configuration registers).

The verification process identifies whether any of the then-current values of the control signals are different than the values of the control signals intended to be used by the main digital control unit (or, in certain embodiments, or DMS configuration register values do not match expected values).

The response signal includes a cyclic redundancy code based on (i) the then-current values of the control signals being used by the main digital control unit and (ii) a code within the current handshake request received from the digital machine supervisor. In certain more specific embodiments, this CRC is also based on a cyclic redundancy code that has been generated from values in the DMS configuration register.

The predetermined times are periodic instances, each occurring a uniform time interval after the preceding instance.

The safety power management system also includes a bandgap monitor that is configured to detect drift between a first bandgap reference output by the main digital control unit and used for voltage generation and a second bandgap reference output by the main digital control unit and used for voltage monitoring The foregoing summary is intended merely to provide a brief description of certain aspects of the invention. A more complete understanding of the invention can be obtained by referring to the claims and the following detailed description of the preferred embodiments in connection with the accompanying figures.

BRIEF DESCRIPTION OF THE DRAWINGS

In the following disclosure, the invention is described with reference to the accompanying drawings. However, it should be understood that the drawings merely depict certain representative and/or exemplary embodiments and features of the present invention and are not intended to limit the scope of the invention in any manner. The following is a brief description of each of the accompanying drawings.

DESCRIPTION OF THE PREFERRED EMBODIMENT(S)

Figure 1:
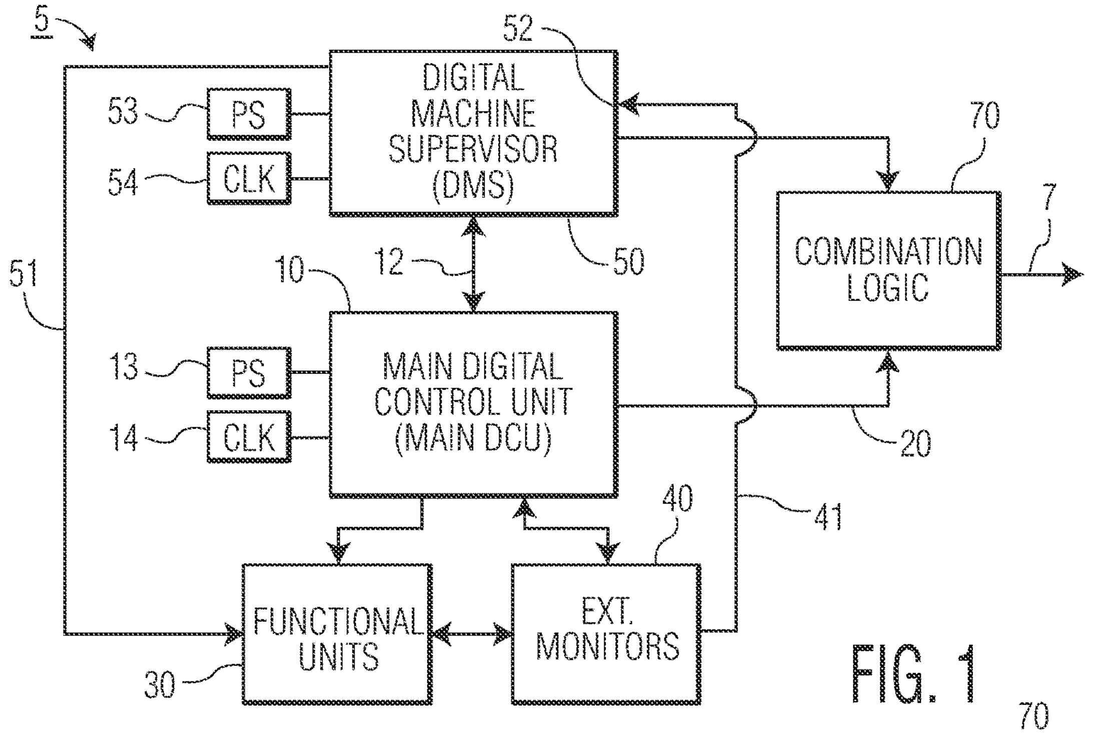
FIG. 1 is a simplified block diagram of a safety power management system.

For ease of reference, the present disclosure is divided into sections. The general subject matter of each section is indicated by that section's heading. However, such headings are included simply for the purpose of facilitating readability and are not intended to limit the scope of the invention in any manner whatsoever.

Overview

The present invention concerns systems, components, methods and techniques that primarily are intended to be part of a power management integrated circuit (PMIC) targeting automotive applications with a high safety integrity level (e.g., Automotive Safety Integrity Level ASIL-D). Embodiments within an automotive context are discussed herein. However, it should be understood that the present invention also/instead can be applied in other contexts as well.

An automotive PMIC typically includes two types of elements, analog and digital, which, in turn, can perform two general types of actions: functional operations or monitoring operations. Each analog block typically provides standalone operation(s), but usually also interacts with a digital controller which controls, sets configuration(s) of, and/or evaluates the output(s) of, such analog block.

Functional operation encompasses the actual functions for which the device is intended, and such functional operations typically are implemented through a combination of circuitry (e.g., analog and/or digital hardware, controlled using a special-purpose digital processor, although in alternate embodiments, a general-purpose digital processor, e.g., programmed using software and/or firmware, is used). The following are typical functional operations in a PMIC:

- Voltage generation with Switching Regulators
  - High frequency oscillator
  - Bandgap Reference
  - Current Reference
- Voltage generation with low dropouts (LDOs)
  - Bandgap Reference
  - Current Reference
- Interfacing I/Os
- Configuration Registers
- Communication Interface.

Monitoring operations include the operations intended to monitor the integrity of the functional operations, and they too typically are implemented through a combination of circuitry (and, in alternate embodiments, programming). The following monitoring operation are typical within a PMIC:

- Voltage Monitoring
  - Over voltage
  - Under Voltage
  - Bandgap Reference
  - Current Reference
- I/O short detection
- CRC calculation on I2C communication
- Clock Monitoring
- Bandgap Monitoring A device targeting safety applications preferably is provided with a monitoring mechanism in order to be able to detect the occurrence of a random failure that can potentially violate the safety goal of the system and then provide notification of that failure. A random failure can violate a particular safety goal directly (referred to as a single-point failure) or can affect a monitoring mechanism, e.g., preventing such mechanism from detecting a single-point failure when it occurs (referred to as a latent failure). A device targeting a particular safety integrity level, must meet certain hardware metrics for fault detection coverage, typically analyzed via a quantitative analysis such as a FMEDA (Failure Modes, Effects, and Diagnostic Analysis). For example, an ASIL-D system must detect at least 99% of single-point failures (faults violating the safety goal directly) and at least 90% of latent faults (faults in the safety mechanism). In order to meet the required metrics, it is necessary to cover random failures affecting: the functional operation(s) (single-point failures), a safety mechanism (latent failures), or both functional and monitoring operation(s) (common-cause failures) in any manner that would violate the safety goal(s).

A safety architecture preferably provides functional operations and monitoring operations with an appropriate level of independence. In order to achieve such independence, the safety architecture can use the following general approaches:

- Independent circuitry for the functional and monitoring blocks, respectively; and/or
- Redundant circuits performing the same operation.

Independence in the analog circuits is straightforward to achieve; however, logic independence is not as straightforward. In this regard, a high safety-integrity architecture preferably ensures logic independence between the functional operations and the monitoring operations in order to avoid non-detected common-cause failures.

Most of the conventional architectures targeting high safety-integrity levels ensure independence by implementing two fully independent logic controllers, one performing all the functional operations and another performing all the safety-monitoring functions. However, the present inventor has discovered several disadvantages to this approach, e.g., including the following:

- It typically requires duplication of biasing blocks with full specs (to support full functionality in both domains);
- Latent failures in the safety digital control may not be detectable all the time.
- It is not portable. That is, such a conventional safety digital control is specific to a particular system on a chip (SOC). As a result, a change in hardware is required, and the digital control typically must be redesigned and revalidated for each new system.
- It is not highly scalable. That is, such conventional architecture is not suitable for very small devices, with safety overhead often being more expensive than the functional aspects (operations and components).
- It is sensitive to system-level errors.
- It involves unnecessary additional complexity for execution of the system integration.
- A non-responsive Main (functional) Domain sometimes results in a potentially detectable, but nevertheless damaging, condition.
- A non-responsive functional safety (FS) Domain sometimes results in functional operation without any monitoring capability.

To address these issues, as shown in FIG. 1, a safety system 5 according to the preferred embodiments of the present invention utilizes a Main Digital Control Unit (Main DCU) 10, that controls most, substantially all or all of the functional units 30 (e.g., implementing any or all the functions mentioned above), independent or external monitoring blocks or units 40, and a fully independent mechanism, referred to as a Digital Machine Supervisor (DMS) 50, which primarily is in charge of monitoring the integrity of the Main DCU 10 and responding to alerts from the external monitoring blocks 40.

In the current embodiments, the functional units 30 include a number of separate blocks, modules or units that supply or are part of a larger system (such as an automotive electrical/electronic system and, in any event, typically referred to herein simply as a "system" without any proceeding qualifier), such as one or more system power supplies, clocks, monitoring circuits (such as any of the monitoring units 40), etc. In other words, the functional units 30 and monitoring units 40 can be considered part of the safety system 5 and/or the larger system to which safety system 5 pertains (or of which it is a part). The Main DCU 10 and the monitoring units 40 monitor the operations of such functional units 30. Such functional and monitoring operations can be conventional and, therefore, are not discussed in significant detail here. Instead, the present discussion primarily focuses on the present invention's unique architecture which utilizes a relatively simple DMS 50, e.g., in combination with a Main DCU 10.

More specifically, the following discussion primarily focuses on the DMS 50 and the implementation of the Main DCU 10 within the context of a PMIC SOC. However, the DMS 50 also can be used in other types of analog mixed-signal SOCs. The main goal of using the DMS 50 in the context of a PMIC SOC is to achieve a low-cost, scalable and highly reusable architecture to develop PMIC solutions for a wide variety of markets with significantly lower research and development (R&D) investment, as compared to conventional architectures.

The preferred embodiments of the present invention therefore provide, among other things, a low-cost, flexible and independent stand-alone safety state machine (e.g., DMS 50) that is in charge of monitoring the integrity of the Main DCU 10 for analog and mixed-signal devices with functional safety integration targeting ASIL-B, -C or -D applications. In the preferred embodiments, the DMS 50 is the core building block for analog and mixed-signal devices supporting functional safety mechanisms up to ASIL-D applications. The DMS 50 preferably acts as a fully independent state machine, performing real-time dedicated system integrity checks over the functional Main DCU 10, which in turn is in charge of executing the system operations (i.e., performing functional tasks), as well as system monitoring (i.e., safety mechanisms). As discussed in greater detail below, the integrity of the Main DCU 10 preferably is checked through a safety handshake (SHS) protocol, which uses bidirectional communication (request/answer) 12 to achieve self-redundant monitoring to detect "drifts", "stuck" and "bad processing" conditions in the Main DCU 10 and/or in the DMS 50. As discussed below, the bidirectional communication link 12 preferably also is used for the main DCU 10 to configure certain aspects of the DMS 50, thereby greatly enhancing portability of a single DMS 50 design.

Figure 2:
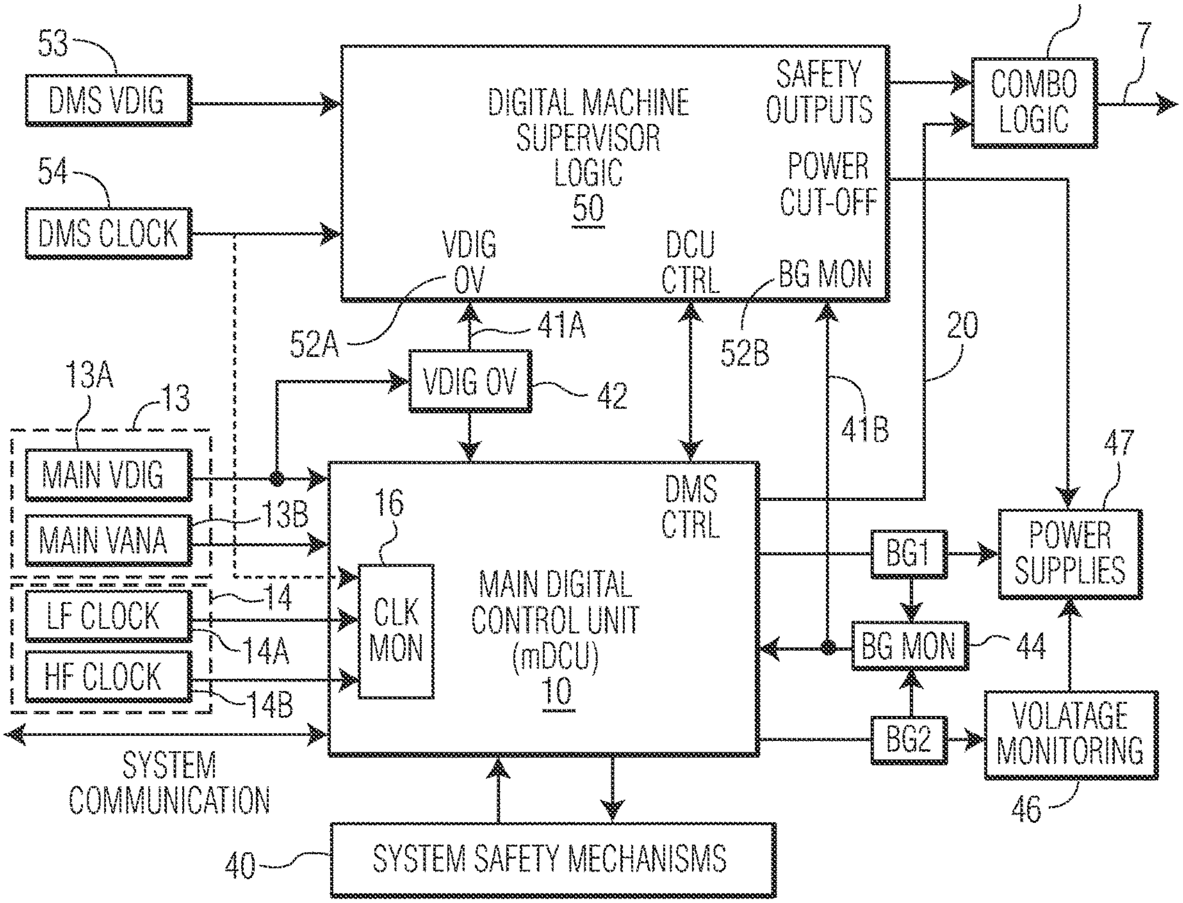
FIG. 2 is a block diagram showing the implementation of a Digital Machine Supervisor (DMS) in a power management integrated circuit (PMIC) and illustrating interfaces between a main Digital Control Unit (DCU) and a DMS.
Figure 3:
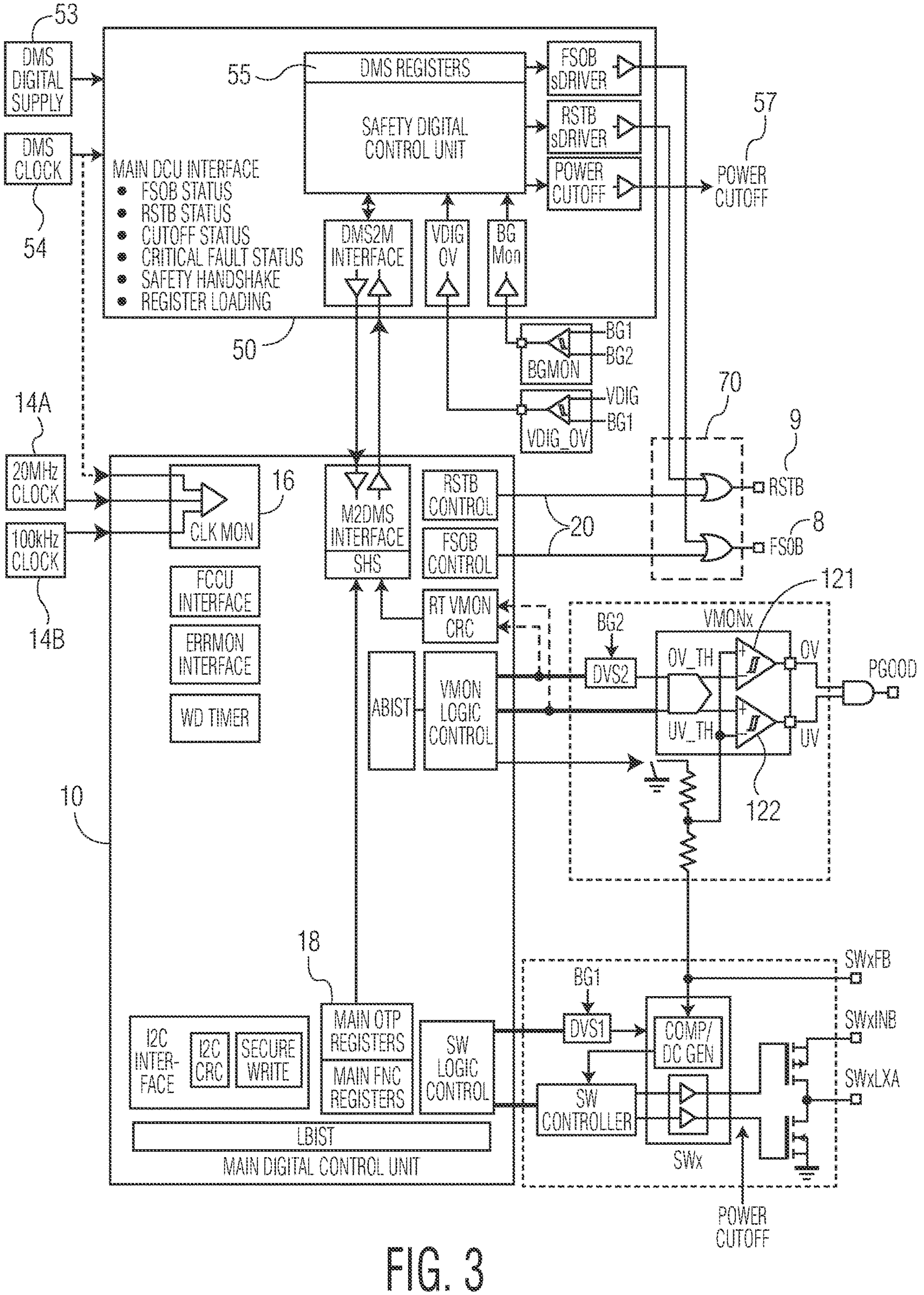
FIG. 3 is a block diagram illustrating the implementation of the DMS in the context of a PMIC system on a chip (SOC).

As also discussed in greater detail below, the DMS 50 preferably includes inputs 52 for inputting status and/or alert signals 41 from external monitoring blocks 40, in order to monitor the status of the key functional (e.g., analog) blocks 30 that could lead to a direct violation of the safety goals of the SOC. That is, such inputs 52 are coupled (e.g., directly connected) to the outputs of corresponding monitoring blocks 40. Referring briefly to FIGS. 2 and 3, such external monitoring blocks 40 can include, e.g., a main digital supply overvoltage monitor VDIG_OV 42 and a bandgap monitor 44. Either or both of such external monitoring blocks 42 and 44 and/or other monitoring blocks 40 preferably are capable of independently identifying and then providing a signal 41 (e.g., signal 41A or signal 41B, respectively) indicating a fault condition (to inputs 52A or 52B, respectively, of DMS 50), e.g., without the need for logic processing in the Main DCU 10. At the same time, the Main DCU 10 preferably includes one or more internal monitoring blocks, such as clock monitor 16, which monitors frequency drift of the clock signals from Main DCU low-frequency clock 14A, Main DCU high-frequency clock 14B and DMS clock 54.

In the preferred embodiments, the safety system 5 provides one or more system safety output(s) 7, e.g., to the master control unit (MCU) of a larger functional system (e.g., an automotive electrical/electronic system) of which safety system 5 is a part, or with which safety system 5 interacts. The details of such larger functional system are not important to the present invention and, therefore, such system is not discussed in any detail here. Preferably, the DMS 50 has high priority control of such system safety output(s) 7, e.g., to ensure such larger functional system is placed in safe states when a fault condition is found in the Main DCU 10. However, control of such system safety output(s) 7 also is exercised within the Main DCU 10, to ensure the safety system 5 is self-redundant (e.g., so that the larger functional system can be placed in a safe state if either the Main DCU 10 or the DMS 50 has an issue). Combination logic 70 specifies how the outputs of Main DCU 10 and DMS 50 generate such system safety output(s) 7. Referring again to FIGS. 2 and 3, in the current embodiment, such system safety output(s) 7 include a fail-safe notification 8 (FS0B), which preferably can be used by the MCU to take a desired action (e.g., to slow down or minimize activity) and a hard reset signal (RSTB) 9, which preferably causes the MCU to immediately reset.

Through signals 51, the DMS 50 preferably also has direct control of one or more of the functional units 30 (e.g., the power stage of the critical power supplies, thereby allowing the DMS 50 to disable the outputs of such power supplies in the event of a critical system failure). In the preferred embodiments, the DMS 50 is a fully independent mechanism, implemented as a logic state machine, with its own digital power supply 53, and clock/oscillator 54, which are independent of the power supply 13 (which, in the current embodiment, includes a digital power supply 13A and an analog power supply 13B) and clock 14 (which, in the current embodiment, includes a low-frequency clock 14A and a high-frequency clock 14B), respectively, for the Main DCU 10. Because the functionality of the DMS 50 preferably is fixed and tightly defined, it can be a cost-effective structure for providing coverage for latent faults generated by logic errors, including the sudden loss of the Main DCU 10. Additionally, it can eliminate common-mode failures that otherwise would prevent the system 5 from detecting potential single-point failures.

The robust implementation of functional safety architectures to comply with ASIL-D systems traditionally requires significant overhead to achieve true coverage that will detect single-point failures and eliminate latent faults, as well as common-mode failures, thereby ensuring reliable systems that are capable of fulfilling the metrics proposed by the International Organization for Standardization ISO 26262 standard, not only at the system level, but also at the component level. Due to these metrics, the safety architectures conventionally have been substantial in nature and, therefore, more expensive, thus limiting the ability to scale down in a cost-effective way, typically due to the need to have two fully featured functional (main and fail-safe) state machines with physical isolation.

The implementation of the DMS 50 according to the preferred embodiments of the present invention is intended to remove the need for a full-featured fail-safe state machine, hence eliminating all the bias, fuse control, dedicated supplies, and overall complexity needed by the fail-safe state machine. Instead, the preferred DMS 50 can be considered to be a "safety" state machine, which is implemented at a minimum cost due to its simplicity. The implementation of the DMS 50 preferably allows the resulting safety system 5 to be truly scalable on the functional side, as well as in the functional-safety level. This architecture can provide benefits, e.g., to devices intended for cost-sensitive markets that require limited functionality, which is not necessarily a big advantage on its own, but becomes a significant advantage when providing the robustness of the required functional safety without the full overhead of a secondary full-featured state machine.

Additionally, device complexity often can be reduced by limiting the synchronization of the Main DCU 10 and the DMS 50 to very few signals and, thus, minimizing overall cost in design, verification, and test, at the same time that it provides simpler usage from the customer perspective, without sacrificing the safety coverage up to the ASIL-D level. Used in the context of power management integrated circuits, the present invention often can provide a truly low-cost, scalable and highly reusable architecture to develop power management integrated circuit (PMIC) solutions for a wide variety of markets with less R&D investment.

More-Specific Representative Embodiment(s)

Main DCU Interface

Referring to FIGS. 2 and 3, the DMS 50 and the Main DCU 10 communicate with each other to perform configuration and monitoring tasks. When power is applied to the DMS 50 (by power supply 53), DMS 50 preferably asserts the fail-safe notification 8 by default and waits for the Main DCU 10 to start a synchronization process, during which Main DCU 10 loads DMS 50 with configuration information. Upon completion of the synchronization process, DMS 50 releases the fail-safe notification 8, thereby allowing the safety system 5 to perform its normal operations. More preferably, during the foregoing synchronization process, the Main DCU 10 loads the configuration registers (i.e., a subset of registers 55) within the DMS 50, with information used to customize the protection level and reactions provided by the DMS 50, as well as loading into registers 55 a reference monitoring cyclic redundancy code (CRC), i.e., a reference RT_MON_CRC, which is calculated using signals that are provided from the Main DCU 10 logic into the various external monitoring blocks 40 covered by the DMS 50.

It is noted that while the present embodiment uses a reference CRC, which has desirable properties for the current purposes (e.g., short while still providing good error-detection capabilities), in alternate embodiments a different reference code representing the values of control signals intended to be used by the Main DCU 10 (even potentially including a concatenation of such control signal values) instead is provided. More generally, any reference herein to a CRC can be replaced (in an alternate embodiment) with a reference to a different kind of code that is or represents (e.g., a hash of) the subject data.

Generally speaking, the reference RT_MON_CRC value provided during synchronization can be thought of as a composite value (in this particular case, a CRC) representing the control signals that are expected to be provided by the Main DCU 10 to the monitoring blocks 40. During the handshake process (described below), the safety system 5 verifies that the Main DCU 10 is continuing to provide those same control signals on an ongoing basis. In the event that the Main DCU 10 is instructed to provide different control signals to one or more of the monitoring blocks 40 (e.g., by the MCU), the synchronization process preferably is rerun, and in that process, a new reference RT_MON_CRC is calculated by the Main DCU 10 and then provided to the DMS 50.

Safety Handshake

During normal operations (preferably, at all times when the overall system is operating and not performing a synchronization process), DMS 50 and Main DCU 10 repeatedly and continually perform a safety handshake process (via bidirectional communication line(s) 12) in which the DMS 50 sends a handshake request to the Main DCU 10 at predetermined times, and the Main DCU 10 responds with a response key within a specified window thereafter. Preferably the safety handshake procedure is able to: (1) test the ability of the Main DCU 10 to process information and (2) test the logic integrity of critical monitoring blocks. In addition, the processing performed by the Main DCU 10 and the DMS 50 in connection with the safety handshake process preferably is done using independent clock signals (i.e., from clock 14 and clock 54, respectively, in the current embodiment).

Figure 4:
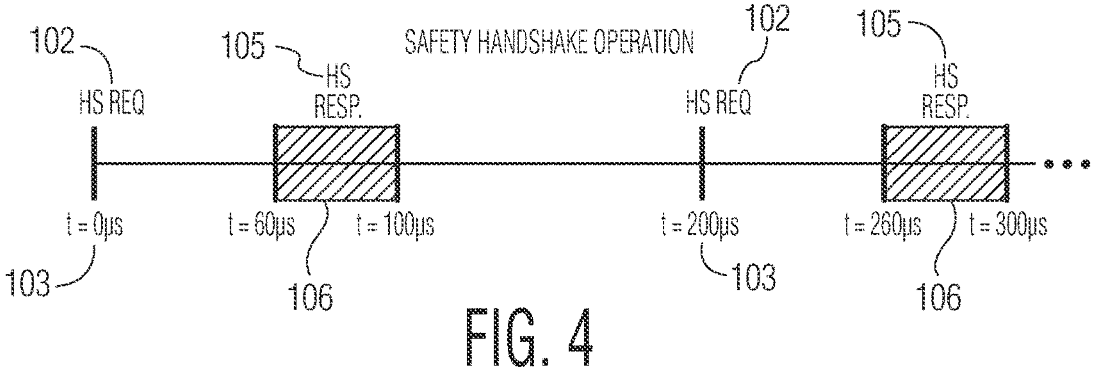
FIG. 4 illustrates a safety handshake timing diagram.

FIG. 4 illustrates the timing diagram used in the current implementation of the safety handshake. Specifically, when the safety handshake is enabled, the DMS 50 sends a handshake request 102 (preferably, a request key) to the Main DCU 10 at periodic points in time 103 (i.e., separated by fixed or uniform time intervals), which are every 200 microseconds (μs) in the current embodiment. After a (preferably, each) handshake request 102 is sent, the Main DCU 10 responds to the request 102 with a handshake response 105 (preferably, a response key) within a specified response window 106 after receiving the request, i.e., 60-100 μs after receiving the request 102 in the current embodiment.

In the preferred embodiments, the handshake request 102 (HS_REQ) is provided by the DMS 50 as an 8-bit key that is generated randomly (which is intended to encompass any process that uses true random generation and/or pseudorandom generation) each time the request 102 is sent. At the same time, or shortly thereafter, the DMS 50 also generates or calculates the appropriate (or expected) safety handshake response. In the current embodiment, the handshake process (request/response) is performed in the following three stages (with the first and second stages being performed in either order, or simultaneously in whole or in part).

Figure 5:
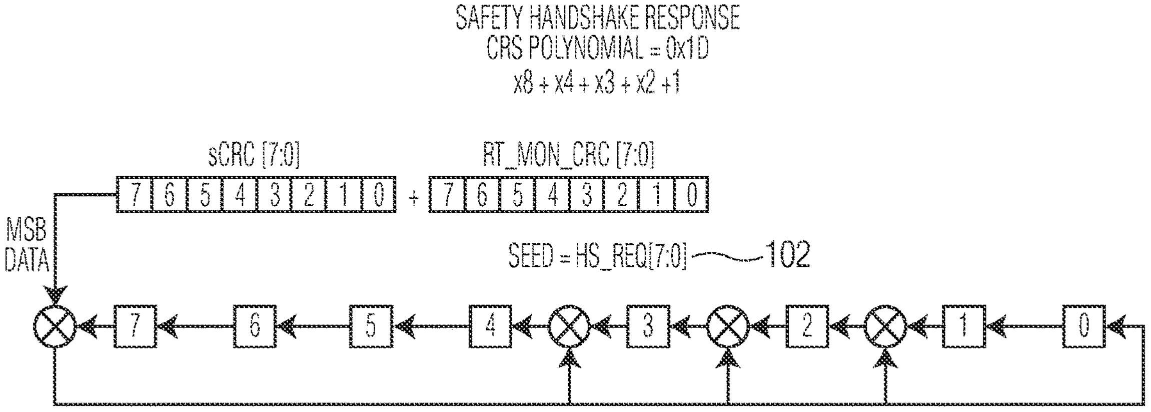
FIG. 5 is a block diagram illustrating a safety handshake response calculation.

In the first stage, as shown in FIG. 5, the Main DCU 10 calculates the current response 105 to the current handshake request 102 using the following data:

- the handshake request key 102 (HS_REQ) received from the DMS 50;
- an 8-bit safety CRC 110 (sCRC) that has been generated using the one-time programmable (OTP) configuration values that the Main DCU 10 originally passed to the DMS 50, as those values are shown in the registers 18 of the Main DCU 10—with this CRC calculated locally by the Main DCU 10; and

| | DMS Register<br>Safety CRC<br>(sCRC) | RT_MON_CRC | Handshake<br>Response CRC |
|---|---|---|---|
| Polynomial | 0x1D | 0x1D | 0x1D |
| Seed | 0xFF | 0xFF | HS_REQ [7:0] |
| DCU<br>Calculation | Local Calculation<br>Every Handshake cycle<br>Main DCU high-frequency (HF) clock | Local Calculation<br>Every Handshake cycle<br>HF clock | Local Calculation<br>Every Handshake cycle<br>HF clock |
| DMS<br>Calculation | Local Calculation<br>Every 2 ms<br>DMS clock | Not Calculated<br>Received from DCU<br>During synchronization phase | Local Calculation<br>Every Handshake cycle<br>DMS clock |
| Inputs | DCU Register:<br>OTP_DMS_CFG1 [7:0] &<br>OTP_DMS_CFG2 [7:0]<br>DMS Registers (internal):<br>DMS_CFG1 [7:0] &<br>DMS_CFG2 [7:0] | VMON Control signals (example):<br>dig2xxx_mon_en<br>dig2xxx_ov_th_sel<3:0><br>dig2xxx_uv_th_sel<3:0><br>dig2xxx_mon_trim_ov<3:0><br>dig2xxx_mon_trim_uv<3:0><br>dig2swx_dvs_data<7:0><br>dig2swx_dvs_ref_buf_trim<3:0><br>dig2ldox_vldo<5:0> | Use locally calculated/stored bytes:<br>sCRC [7:0]<br>RT_MON_CRC [7:0]<br>HS_REQ [7:0] |

- a current 8-bit code (RT_MON_CRC) that has been generated using data obtained from the current real-time sensing of the logic signal(s) controlling the monitoring block(s) 40 (with a corresponding 8-bit reference code having been pushed by the Main DCU 10 into the DMS 50 during the synchronization or re-configuration process)—with this CRC calculated locally by the Main DCU 10

In the second stage, the DMS 50 calculates the appropriate or expected response using the following data (also as shown in FIG. 5, but in this stage, using the reference RT_MON_CRC, rather than the current RT_MON_CRC which is used in the first stage):

- the handshake request key 102 (HS_REQ) it sent to the Main DCU 10 in connection with the current handshake request—previously generated locally by the DMS 50;
- an 8-bit safety CRC (sCRC) that is generated using the configuration values within the local registers 55 of the DMS 50—generated locally by the DMS 50 using the same polynomial and seed as in the corresponding CRC generation in the Main DCU 10; and
- the 8-bit reference code (the reference RT_MON_CRC) provided by the Main DCU 10 during the most recent synchronization or re-configuration process.

In the third stage, the DSM 50 compares the response 105 provided to it by the Main DCU 10 (generated during the first stage) against the appropriate response (calculated locally by the DMS 50 during the second stage) to determine whether the response is valid or not. The DMS 50 acknowledges the Main DCU 10 is functioning and capable of maintaining proper operation as long as the Main DCU 10 answers the handshake request 102 with the valid HS_ANSW key within the required response window 106 (again, in the present embodiment, 60-100 μs after the request 102 was sent). If the Main DCU 10 fails to properly answer the handshake request 102 within the required window 106, the DMS 50 detects a system failure, and it asserts the fail-safe notification 8 (FS0B) to place the overall system in a safe state and, potentially, reacts in an even more aggressive way, e.g., as configured by the registers of the DMS 50.

The following table below summarizes the CRC calculations involved during the safety handshake process of the current embodiment.

In addition to the foregoing processing, in the current embodiment, the Main DCU 10 checks to ensure that a handshake request 102 is received at the expected predetermined times 103 (e.g., every 200 μs in the current embodiment, or within a specified error margin, such as no more than 1-3 μs from the expected time). If it does not in fact receive such a request when expected, the Main DCU 10 preferably outputs an error signal (e.g., on one of line(s) 20), which preferably is interpreted to mean that there is potentially a problem with the Main DCU 10, the DMS 50 and/or at least one of their respective clocks 14 and 54.

Handshake Response Calculation

Any of a variety of different CRC polynomials may be used to calculate the handshake response 105 in the various different embodiments of the present invention. However, it preferably is implemented in such way that the response 105 always provides a valid answer considering all three elements outlined below. An example of the implementation to calculate a valid response 105 within both the DMS 50 and the Main DCU 10, is as follows:

- A CRC calculation based on the CRC-8-SAE standard is implemented using an 8-bit polynomial (e.g., 0x1D→x8+x4+x3+x2+1)
- The handshake request key 102 (HS_REQ) is used as the initial value (seed) for the polynomial.
- The CRC is calculated by shifting 16 bits of data through the CRC polynomial.
- The 16-bit package is built with the information obtained from the system 5 to test the integrity of the logic circuit, e.g., as shown in FIG. 5.

DMS Register CRC Calculation

Figure 6:
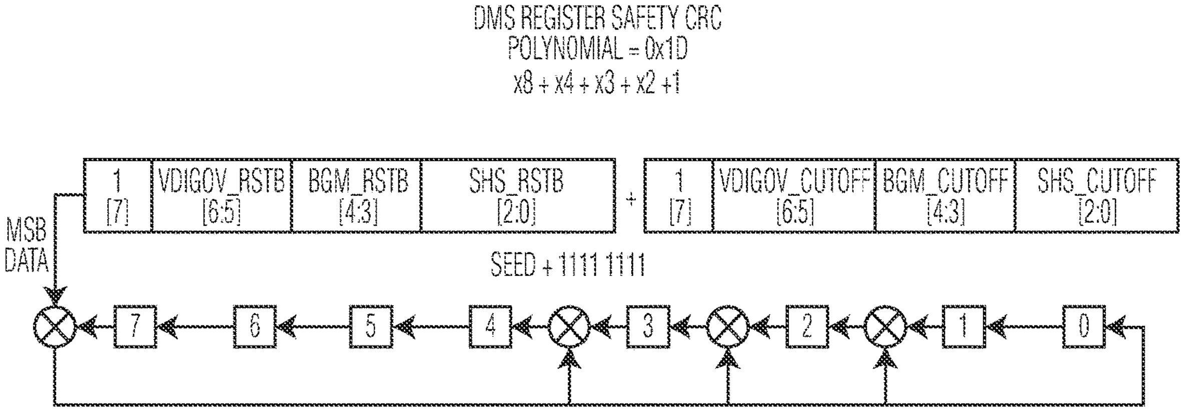
FIG. 6 is a block diagram illustrating a safety CRC calculation using the DMS registers.

As noted above, the DMS 50 calculates the safety CRC (sCRC) using the values within its configuration registers. An example of such a calculation is shown in FIG. 6. In the current embodiment, the DMS 50 clock 54 can run at a minimum of 2 MHz to ensure proper reaction timing; considering such clocking frequency, the safety CRC is recalculated every 2 milliseconds (ms) in the DMS 50 and stored in internal memory inside the DMS 50, so it is ready to be used to calculate the appropriate (or expected) handshake answer, which is then compared against the actual handshake response 105 received from the Main DCU 10 (as discussed above). The DMS 50 preferably always uses the latest sCRC stored in memory to calculate the appropriate handshake answer. In this regard, both the Main DCU 10 and the DMS 50 preferably have independent access to the configuration registers for the DMS 50. However, because the DMS 50 can be operating at a much lower frequency in the current embodiment, a 2 ms latency is more than enough to check for a potential latent failure in the DMS 50. By using a real-time calculation of the safety CRC on the main DCU 10, the safety handshake ensures the Main DCU 10 is responding properly and the configuration on the DMS 50 is consistent with the selected values in the configuration registers 55.

RT_MON_CRC Calculation

Figure 7:
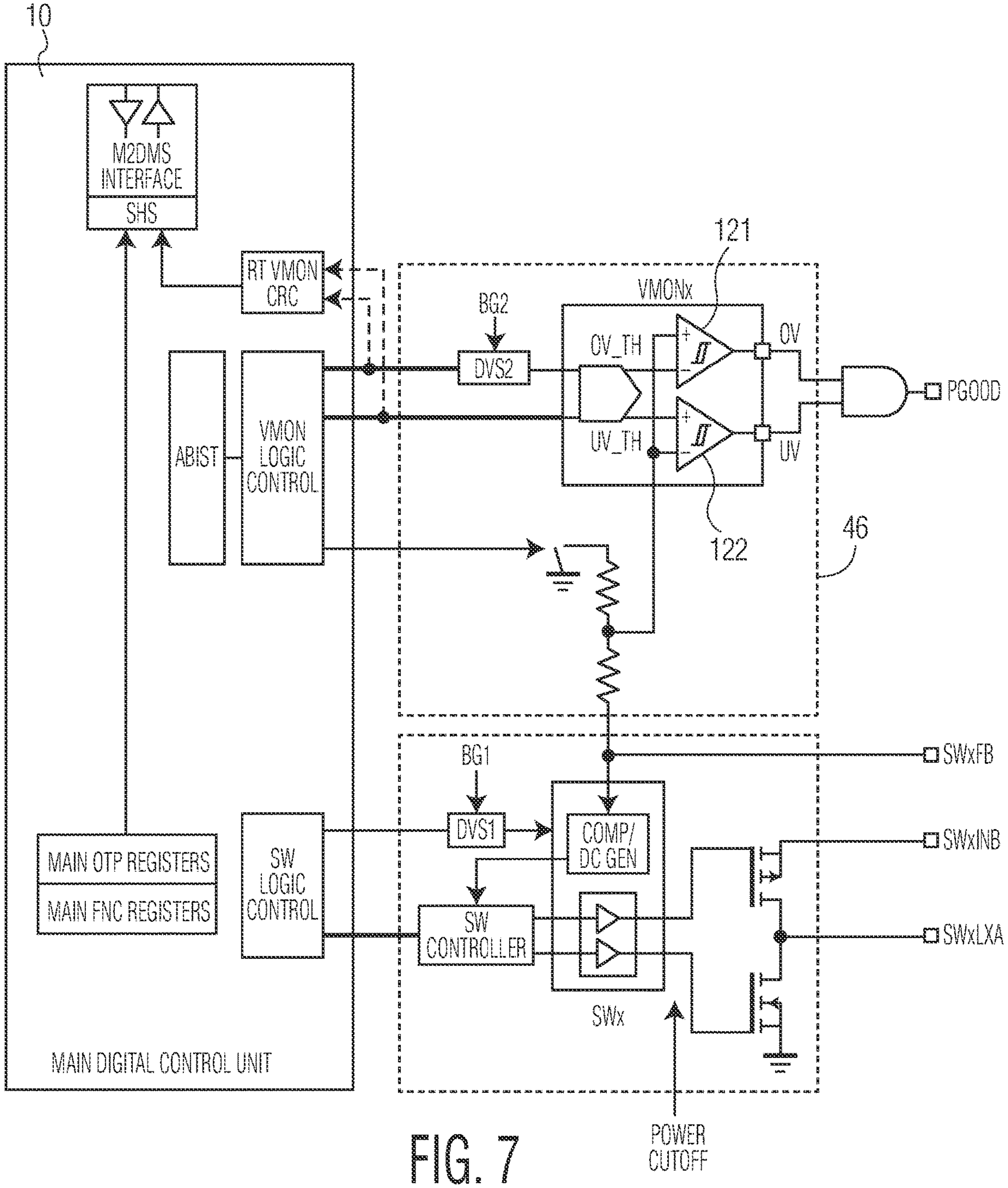
FIG. 7 is a block diagram illustrating calculation of RT_MON_CRC.
Figure 8:
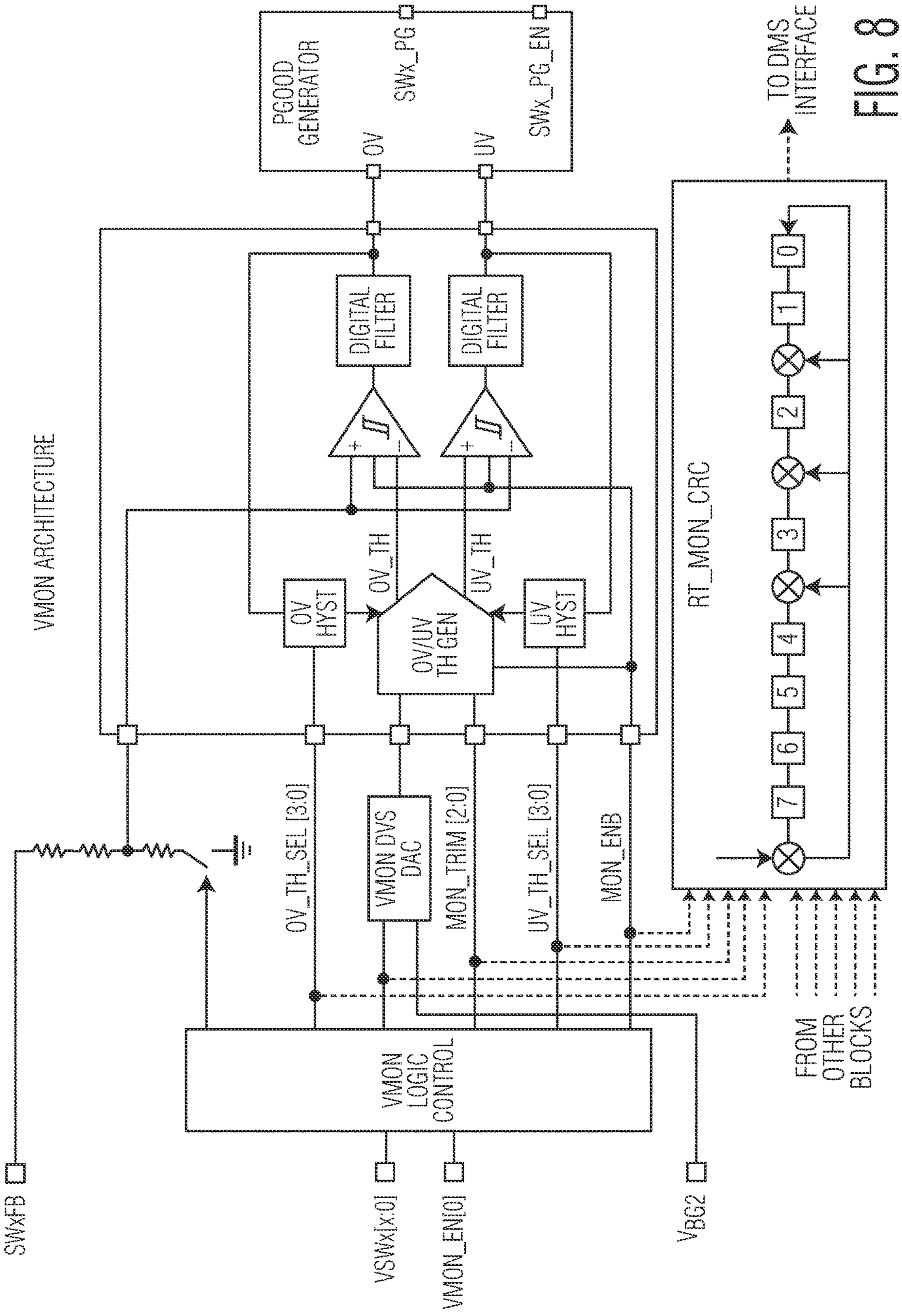
FIG. 8 is a block diagram illustrating a voltage monitoring (VMON) architecture.

The operation of the DMS 50 preferably is agnostic to the hardware configuration within the SOC, relying on the reference RT_MON_CRC code provided by the Main DCU 10 during the synchronization process to evaluate the real-time statuses of the independent safety monitoring blocks 40. The SOC architect identifies/specifies which signals are to be included in the RT_MON_CRC calculation based on the possibility of a random failure in such signals leading to an undetectable single-point or latent failure. For instance, in the context of a PMIC, the voltage monitoring (VMON) blocks 46 (which monitor the power supplies 47 for the larger functional system) are the critical safety mechanisms whose logic integrity typically is important or even necessary to eliminate common-mode conditions, as well as to eliminate undetectable latent failures derived from the incorrect selection of a monitoring threshold. FIG. 7 illustrates an example applied to the context of a PMIC in which the critical monitoring blocks 46 are (or include) the overvoltage and undervoltage (OV/UV) monitors 121 and 122, respectively.

Figure 9:
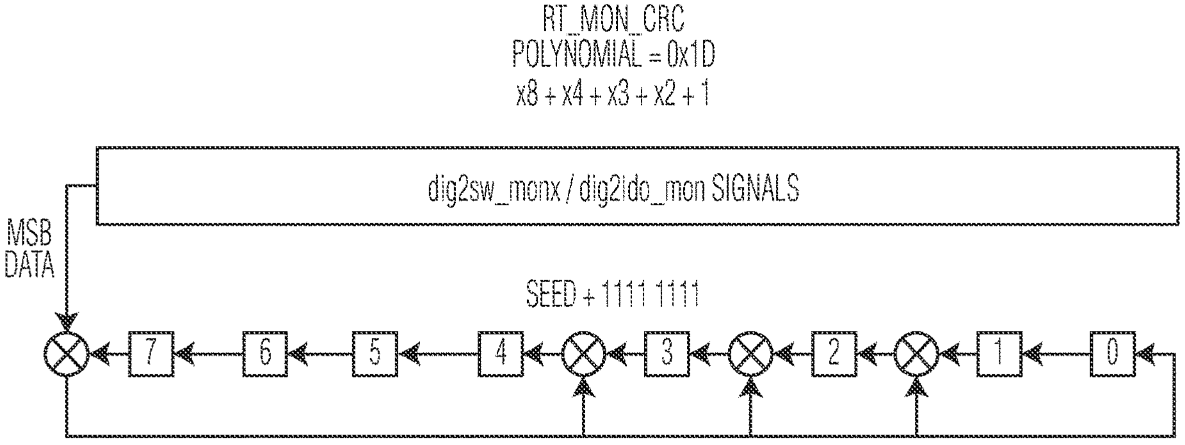
FIG. 9 is a block diagram illustrating real-time monitoring CRC (RT_MON_CRC) calculation.

In the current embodiment, as shown in FIG. of this drawing, the Main DCU 10 provides inputs to the digital block, in order to capture the actual value set at the input of the analog block. It will then shift all the signals into the RT_MON_CRC block to generate the 8-bit CRC key, which is used to calculate the response for the safety handshake later on. If the Main DCU 10 has an issue and it is providing the incorrect level for one of the configuration signals, the current RT_MON_CRC will have a different value than expected (as calculated by the DMS 50), so its safety-handshake response will also be incorrect, allowing the DMS 50 to identify a fault condition, such as a bridging fault, a common-cause fault and/or an undetectable latent fault. FIG. 9 illustrates a real-time monitoring CRC (RT_MON_CRC) calculation, and the following is an example of a list of signals that are shifted through the RT_MON_CRC polynomial in the context of a safety power management integrated circuit.

| Signals | Bit Count | Fault Type | Rationale |
|---|---|---|---|
| dig2xxx__mon__en | 1 | Latent | Monitor may get disabled randomly and be unable to detect a single point fault |
| dig2xxx__ov__th__sel<3:0> | 4 | Latent | And error in the OV/UV threshold/trim bits may fall out of the acceptable detection window and unable to detect a single point failure (un-safe fault). a Threshold tightening the detection window may detect false fault conditions (Safe fault) |
| dig2xxx__uv__th__sel<3:0> | 4 | Latent | |
| dig2xxx__mon__trim__ov<3:0> | 4 | Latent | |
| dig2xxx__mon__trim__uv<3:0> | 4 | Latent | |
| dig2swx__dvs__data<7:0> | 8 | SPF | The dvs bits set the regulation set point for the Switching regulators by controlling the DVS DAC inside the Switcher IP. At the same time, these signals go to the DVS OV/UV reference generator which provide a Reference voltage to the VMON. A random error on these bits will result in both regulation and monitoring shifting together, causing an non-detectable single point fault. |

-continued

| Signals | Bit Count | Fault Type | Rationale |
|---|---|---|---|
| dig2swx__dvs__ref__buf__trim<3:0> | 4 | Latent | A bad trim on the DVS reference may place the monitoring out of range potentially unable to detect a single point fault. |
| dig2ldox__vldo<5:0> | 6 | SPF | These bits set the regulation level in the Switching regulators by controlling the voltage selection IP, at the same time, these signals go to the ldo__mon__div reference generator which provide a Reference voltage to the VMON. A random error on these bits will result in both regulation and monitoring shifting together, causing a non-detectable single point fault. |

Validating the RT_MON_CRC value

The Main DCU 10 preferably utilizes robust algorithms to ensure the RT_MON_CRC code being sent to the DMS 50 is valid, so that the real-time evaluation of the safety handshake is always based on a valid reference. In the current embodiment, the Main DCU 10 sends the initial/reference RT_MON_CRC code to the DMS during the synchronization phase. In order to ensure the reference RT_MON_CRC is correct (i.e. no error present when the reference value is calculated), the Main DCU 10 preferably runs a simple comparison between the register bits, providing the configuration of the blocks, and the actual signals coming out of the digital block. In this regard, the configuration bits are already covered by the OTP CRC and the Dynamic CRC algorithm, so it is acceptable to assume these bits always hold the correct value; therefore, by comparing the digital signal with the corresponding bits during the synchronization process, the safety system 5 can ensure it by using the correct values to calculate the reference to perform the handshake calculations in the DMS 50. It is noted that, in the current embodiment, the validation of the reference RT_MON_CRC is performed only during the synchronization phase; any random discrepancies found during the handshake evaluation will be found by the handshake process discussed above.

DMS Synchronization

Figure 10:
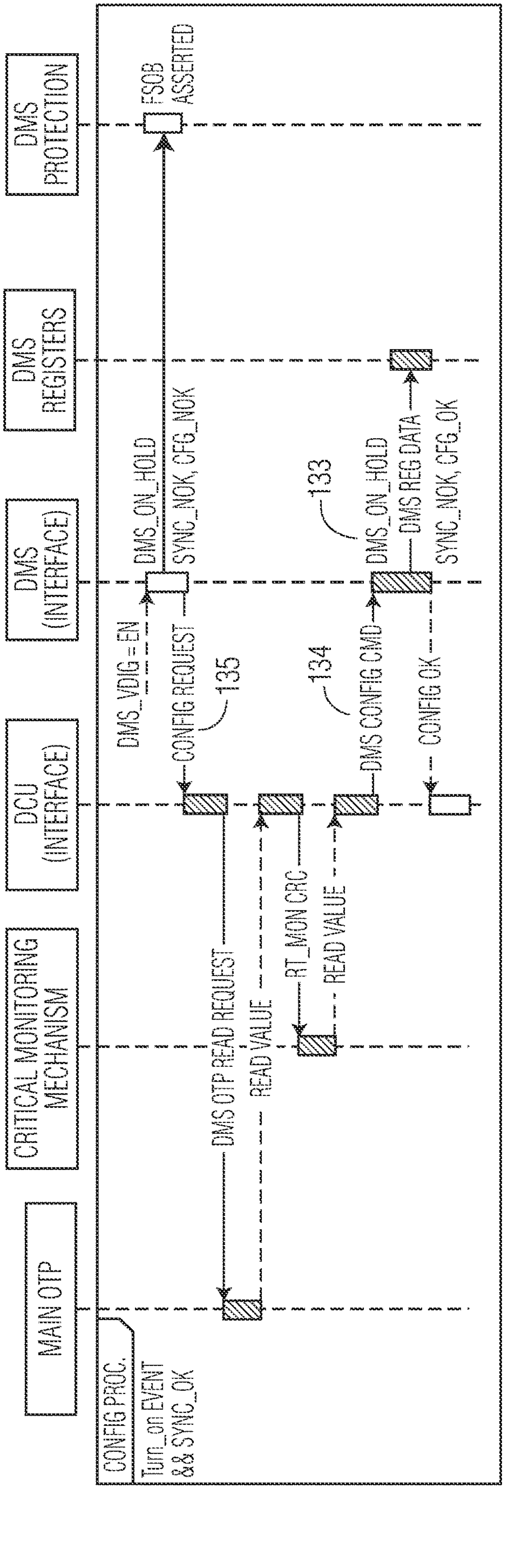
FIG. 10 is a flow diagram illustrating implementation of a configuration process.
Figure 11:
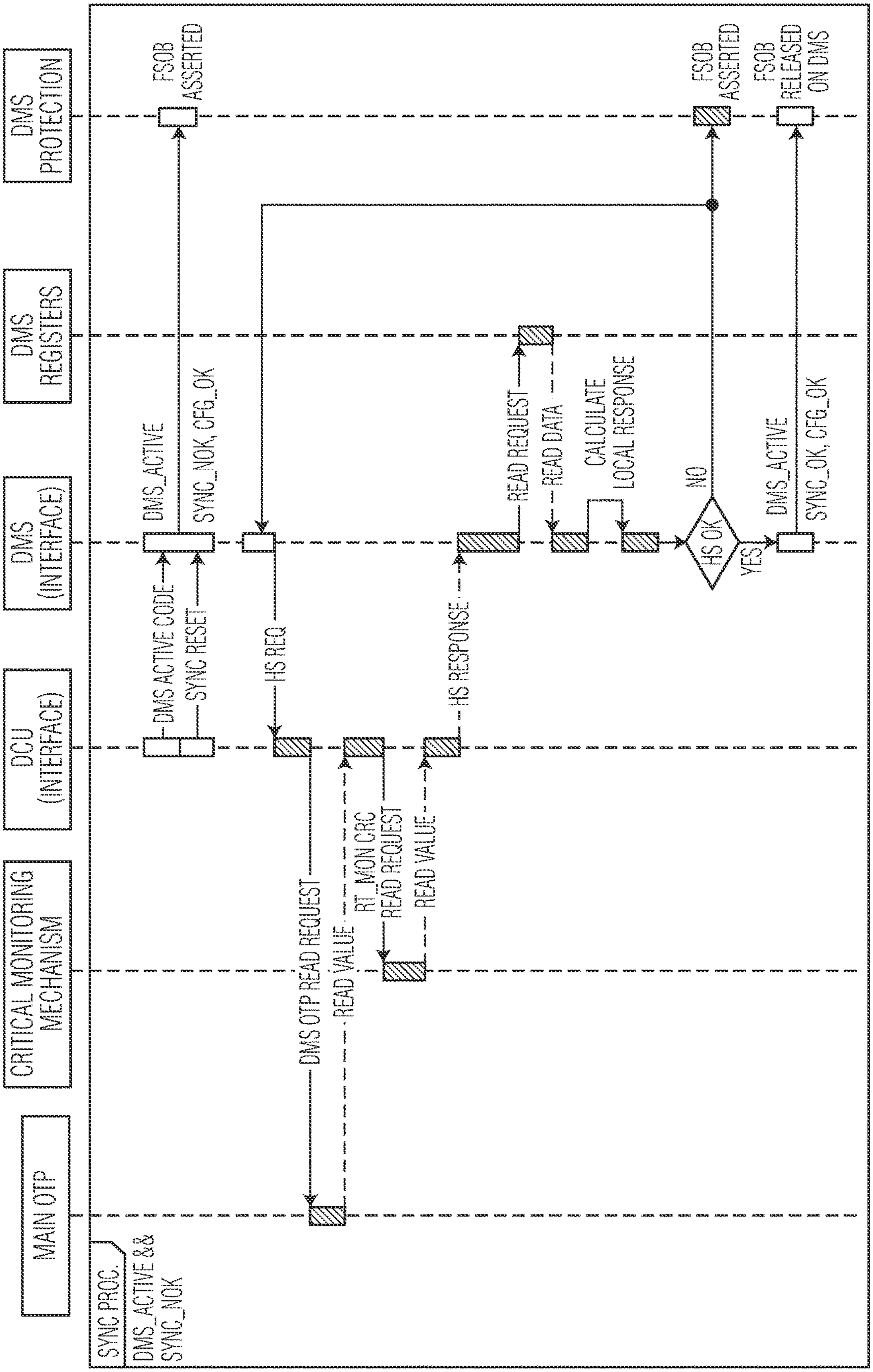
FIG. 11 is a flow diagram illustrating implementation of a synchronization process.
Figure 12:
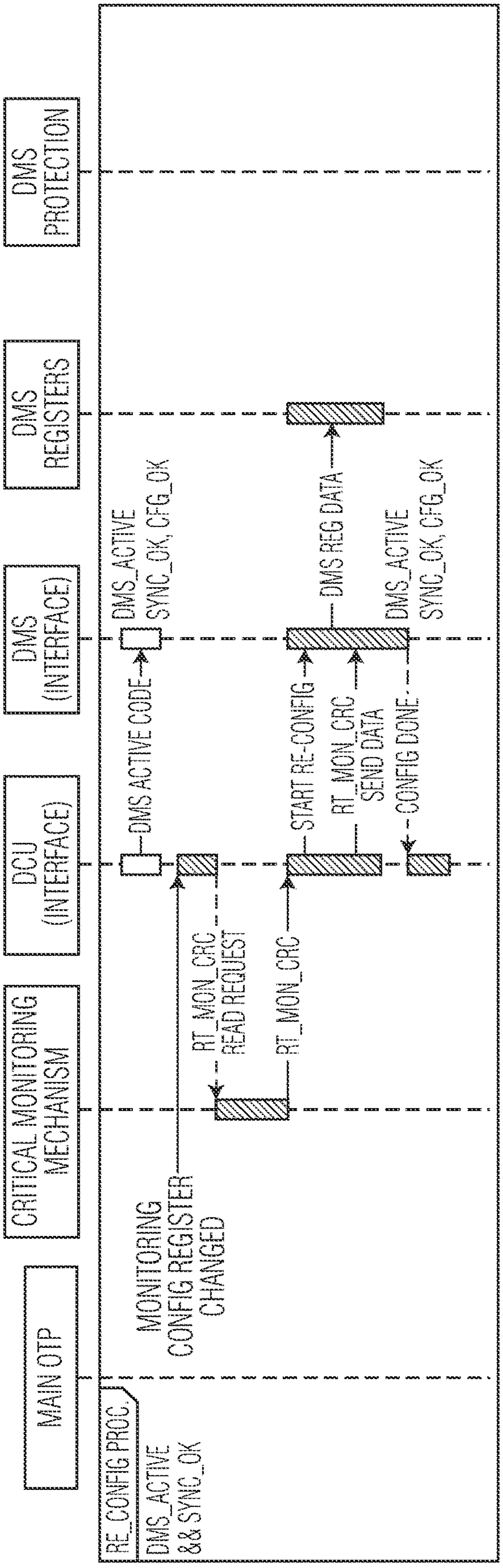
FIG. 12 is a flow diagram illustrating implementation of a reconfiguration stage.

The following discussion concerns one specific implementation of DMS 50 synchronization, i.e., in the current embodiment of the invention, with reference to FIGS. 10-12.

Configuration Process

In the current embodiment, the DMS 50 can be disabled in either of two ways:

1. the DMS 50 digital power supply 53 is disabled (low power operation); or
2. the Main DCU 10 provides a “DMS_ON_HOLD” command 133 (dcu2dms_active[3:0]=0110).

Also in the current embodiment, when the digital power supply 53 is applied and the DMS 50 crosses the power-on reset (POR) threshold (e.g., falls below the undervoltage threshold), all registers and flags are set to their default state, e.g., as follows:

- SYNC status is set to SYNC_NOK (dms2dcu_sync_ok=0);
- DMS Registers 55=reset value; and
- CONFIG status is set to CFG_NOK (dms2dcu_cfg_ok=0).

As shown in FIG. 10, the DMS 50 sends a configuration request signal 135 (dms2dcu_cfg_req=1), to announce to the Main DCU 10 that the DMS 50 is ready to receive the configuration. While the DMS 50 waits for the DCU 10 to be ready to send the configuration command 134, the DMS 50 remains in a protective state (e.g., FS0B 8 asserted, RSTB 9 asserted). Four signals (dcu2dms_active[3:0]) from the Main DCU 10 to the DMS 50 are used to control the ACTIVE status of the DMS 50. To reduce the probability of a random error disabling the DMS 50, only one specific code can set the DMS ON_HOLD; all other combinations set the DMS_ACTIVE.

When the Main DCU 10 becomes alive and able to keep the system 5 in a safe state, it automatically places the DMS 50 on hold (dcu2dms_active[3:0]=0110). When the Main DCU 10 reaches a state where it can process the configuration request 135 coming from the DMS, it retrieves the information from the OTP registers 18 and the real-time monitoring CRC code and sends such information to the DMS 50. When the DMS 50 receives the configuration information, it sets its CONFIG status to CFG_OK (dms2dcu_cfg_ok=1) to notify the Main DCU 10 that it has been configured and is ready to start a synchronization cycle. At this point the DMS 50 is configured but ON-HOLD, and the Main DCU 10 is enabled to start a synchronization sequence to activate the DMS 50 when needed.

Synchronization Process

The SOC architect determines the state in which to enable the DMS 50 (e.g., Self-Test, LPOFF, DBGOFF, etc.) and in which state it should put it ON-HOLD or Disable it, to allow low-power operations (e.g., DMS remove digital supply). Referring to FIG. 11, when the Main DCU 10 is ready to set the DMS_ACTIVE, it requests a manual SYNC Reset (dcu2dms_sync_rst=0 to 1), to ensure the DMS 50 is ready to synchronize, regardless of it being a cold or a warm start. When the DMS 50 is SYNC_NOK and set to DMS_ACTIVE, it asserts the fail-safe notification 8 (FS0B) locally and starts a synchronization sequence.

The DMS 50 keeps the overall system in a default safe state (fail-safe notification 8 asserted) as long as Synchronization is not established. The DMS 50 sends a handshake request to the Main DCU 10 to start the synchronization sequence. When the Main DCU 10 receives the request, it uses the local OTP registers, the real-time sense value for the monitoring mechanism, and the HS_REQ key to calculate the HS_ANSW. When the DMS 50 receives the handshake response, it uses the local Safety CRC (sCRC, from the DMS Registers 55), the stored Monitoring Mechanism CRC key and the HS_REQ key to calculate the HS_ANSW locally. The DMS 50 then compares the received handshake response with the Local HS_ANSW. If the DMS 50 is not able to establish a GOOD Synchronization, it keeps asserting the safety output and retrying a new synchronization sequence. If the DMS 50 gets a valid handshake response, the DMS 50 sets the dms2dcu_sync_ok=1 (SYNC_OK) to start normal operations.

When the DMS 50 is ACTIVE and SYNC_OK, the DMS 50 is able to: (1) signal that the overall system should be placed in a safe state, by asserting any of the safety outputs (e.g., FS0B 8 and/or RSTB 9); and/or (2) start a power cut-off command, when a fault condition is detected by the DMS 50. A fault condition asserting the safety outputs and/or a power cut-off condition preferably is processed as set in the configuration registers of the DMS 50.

Reconfiguration Process

With reference to FIG. 12, when the safety system 5 performs a register update during normal operations, the Main DCU 10 preferably recalculates the new expected/reference monitoring CRC code and sends it to the DMS 50, so that both such blocks have the correct information to calculate the HS response. Subsequently, calculating the real-time monitoring CRC allows the system 5 to confirm that the real-time statuses of the signals match the expected configuration set in the registers of DMS 50. Before sending the new configuration data, the Main DCU 10 communicates to the DMS 50 that it is about to send a new configuration, thereby triggering the DMS 50 to begin a routine for processing such incoming information.

System Monitoring Input Signals

When applicable for a particular SOC, the DMS 50 preferably includes input(s) 52 to detect the status of safety mechanisms used to provide monitoring of (e.g., critical) functions that might impact the operation of the Main DCU 10. In the embodiment involving a PMIC SOC, such signals are coupled to the digital supply overvoltage (OV) monitor 121 and the bandgap comparator 44 used to detect drift between the bandgap reference used for voltage generation and the one used for voltage monitoring. A fault condition detected by the corresponding safety mechanism is observed by the DMS 50, which in turn initiates a protective mechanism by asserting safety output(s) (e.g., FS0B 8 and/or RSTB 9) and/or disconnecting the power stages (to the extent the DMS is programmed to do so). This is because a fault condition on critical blocks such as the main digital supply or the main bandgap reference, may lead to a single-point failure that cannot be reported or controlled by the Main DCU 10 itself; therefore, the DMS 50 is able to take action in case the Main DCU 10 becomes unresponsive.

Safety Output Control

In the current embodiment, the DMS 50 has direct control of the FS0B 8 pin; however, the FS0B 8 is provided with secondary paths to ensure the pin is asserted. In the event the DMS 50 is defective, if the Main DCU 10 does not get a safety handshake request for longer than 200 μs (or, in some embodiments, 200 μs plus some acceptable tolerance margin, preferably not more than 1-3 μs) the FS0B 8 is asserted through the secondary path controlled by the Main DCU 10. If none of the digital blocks is able to control the FS0B 8 pin, the pin is provided with an analog path supplied by one or more alternate power pins to ensure the pin is properly asserted and the overall system remains in the safe state. The RSTB 9 is controlled mainly by the Main DCU 10, however, the DMS 50 provides programmability to enable control of the RSTB 9 when a critical fault condition is detected and the Main DCU 10 may not be able to control the pin itself.

Power Cut-Off Output

Also in the current embodiment, the power cut-off output 57 is provided to request a full disconnection of the power stages on the voltage regulators via an analog path. The power cut-off signal 57 preferably is provided with a triplicate majority voter architecture to avoid unexpected assertion of the signal. The conditions to request a power cut-off event preferably are programmed into the safety registers. DMS 50 start-up and synchronization with the Main DCU 10 preferably are customized to fit the finite state machine of each SOC.

Representative Features and Advantages

As discussed above, the present invention can provide a building block for low-cost functional safety architectures targeting up to ASIL-D levels. This small and cost-effective solution preferably is achieved by limiting the DMS 50 operation to processing of inputs in a clearly defined manner and providing a reliable resolution to ensure the system is placed in a safe state when a single-point fault is present, a monitoring mechanism is defective (latent fault), and/or systematic issues occur due to unexpected process variations (common-mode failures). Because the operation is limited and is mostly in the digital domain, the implementation of the DMS 50 often can be very small (e.g., in the range of a couple hundred microns) plus minimal overhead in analog circuitry (e.g., limited to a digital power supply 53 and oscillator 54).

In addition, such a structure/approach can provide reliable operations. In this regard, when used as a building block of a functional safety architecture, the DMS 50 can help provide a dedicated path for the system safety outputs 7 and ensure the path is asserted when a failure is detected in the Main DCU 10. Likewise, in the event the DMS 50 is experiencing the failure, the Main DCU 10 is capable of controlling the safety outputs 7 to ensure the system is not able to perform critical operation, hence becoming a fully redundant mechanism.

Preferably, the DMS 50 eliminates residual failures due to common-mode failure derived from having a single logic mechanism to generate functional operation and monitoring operation altogether. By integrating the various mechanisms, the DMS 50 typically can provide high coverage to:

- detect no operation of the Main DCU 10 or the DMS 50;
- detect drift in the response of the Main DCU 10 or the DMS 50;
- confirm register configuration is consistent in the DMS 50;
- ensure the Main DCU 10 is able to gather information and process it properly; and evaluate the logic integrity of critical safety mechanisms in the Main DCU 10.

Moreover, the DMS 50 preferably is implemented simply, without too many signals going in and out of the block, making the design easy to design and verify, as well as easy to reuse without major changes.

A system 5 according to the present invention preferably includes the following functional features:

- A dedicated bus 12 is provided to allow the DMS 50 to interface directly with the Main DCU 10. Through this dedicated bus 12, the DMS 50 is able to perform two types of inquiries to the main Control unit:
  - The DMS 50 is able to verify the Main DCU 10 is responsive at all time via the safety handshake (SHS) protocol. Though this protocol, the DMS 50 sends a handshake request 102 to the Main DCU 10 and it expects a specific response 105 (e.g., key) from the Main DCU 10 within a specific window of time 106.

As long as the Main DCU 10 is able to provide an answer 105 (e.g., the correct key) to the handshake request 102 within the required timeframe 106, the DMS 50 acknowledges the Main DCU 10 is functional and capable of continuing to perform its normal operations.

If the Main DCU 10 fails to answer the DMS 50 handshake request 102, the DMS 50 will consider that a failure and will assert the fail-safe notification 8 (FS0B) to place the system in safe state. Once a fault is detected, the DMS 50 will latch a signal to the Main DCU 10 to announce a failure, and will keep trying to send a handshake request 102 in case the Main DCU 10 was able to recover from the failing condition. In the event the failure was temporary, the flag will be readable by the system 5 to provide diagnostic(s) to the MCU, and it can be cleared in order to attempt to resume normal operation after requesting the fail-safe notification 8 (FS0B) to be released.

In the event the system 5 is not able to recover after a specific amount of time, the DMS 50 assumes a critical system failure, and it will automatically disable the power stages for all power supplies, ensuring the larger functional system is no longer providing power without proper control.

The DMS 50 uses the communication interface to receive its initial configuration information from the main one-time programmable (OTP) memory (implemented as a fuse bank in the current embodiment).

The DMS 50 is provided with an input signal coming from a bandgap monitor 44.

When the bandgap monitor 44 is enabled and it detects a significant drift in any direction between the main bandgap and the monitoring bandgap, it sends a signal to notify the DMS 50 about such condition, and then the DMS 50 asserts the safety output(s) and disconnects the power stages of the supplies to avoid system damage.

The architect of the system 5 is able to configure whether the bandgap monitor 44 disables the power stages and/or requests a system reset 9 (RSTB).

The main safety output, fail-safe notification 8 (FS0B), is always asserted to ensure the system is in a safe state.

The DMS 50 is provided with an input signal coming from the VDIG_OV monitor 42.

When the VIN_OV block detects an overvoltage (OV) condition on the digital supply 13A for the Main DCU 10, it sends a signal to notify the DMS 50 about such condition, and then the DMS 50 asserts the safety output(s) and disconnects the power stages of the supplies to avoid system damage.

The system architect is able to configure whether the VDIG_OV condition disables the power stages and requests a system reset (RSTB 9).

The DMS 50 has primary control of the FS0B 8 and RSTB 9 pins; however, both signals are provided with secondary paths to ensure the pin is asserted.

In the event the DMS 50 is defective, if the Main DCU 10 does not get a handshake request, the FS0B 8 and RSTB 9 are asserted through the secondary path controlled by the Main DCU 10 (e.g., hardcoded mechanism to still keep the safety output(s) asserted even if there is no logic control in either the Main DCU 10 or the DMS 50).

System Environment

Generally speaking, each of the units, modules or blocks discussed above and/or shown in the drawings (such terms being interchangeable herein) preferably is a special-purpose machine, implemented entirely in hardware and designed, e.g., using a hardware description language (HDL). In alternate embodiments, however, general-purpose programmable devices instead (or in addition) are used. In general, it should be noted that, except as expressly noted otherwise, any of the functionality described above can be implemented by dedicated (e.g., logic-based) hardware, by a general-purpose processor executing software and/or firmware, or any combination of these approaches, with the particular implementation being selected based on known engineering tradeoffs. More specifically, where any process and/or functionality described above is implemented in a fixed, predetermined and/or logical manner, it can be accomplished by a processor executing programming (e.g., software or firmware), an appropriate arrangement of logic components (hardware), or any combination of the two, as will be readily appreciated by those skilled in the art. In other words, it is well-understood how to convert logical and/or arithmetic operations into instructions for performing such operations within a processor and/or into logic gate configurations for performing such operations; in fact, compilers typically are available for both kinds of conversions.

It should be understood that the present invention also relates to machine-readable tangible (or non-transitory) media on which are stored software or firmware program instructions (i.e., computer-executable process instructions) for performing the methods and functionality and/or for implementing the modules and components of this invention. Such media include, by way of example, magnetic disks, magnetic tape, optically readable media such as CDs and DVDs, or semiconductor memory such as various types of memory cards, USB flash memory devices, solid-state drives, etc. In each case, the medium may take the form of a portable item such as a miniature disk drive or a small disk, diskette, cassette, cartridge, card, stick etc., or it may take the form of a relatively larger or less-mobile item such as a hard disk drive, ROM or RAM provided in a computer or other device. As used herein, unless clearly noted otherwise, references to computer-executable process steps stored on a computer-readable or machine-readable medium are intended to encompass situations in which such process steps are stored on a single medium, as well as situations in which such process steps are stored across multiple media.

Additional Considerations

As used herein, the term "coupled", or any other form of the word, is intended to mean either directly connected or connected through one or more other components, elements or processing blocks, e.g., for the purpose of preprocessing. In the drawings and/or the discussions of them, where individual steps, components, modules or processing blocks are shown and/or discussed as being directly connected to each other, such connections should be understood as couplings, which may include additional steps, components, modules, elements and/or processing blocks. Unless otherwise expressly and specifically stated otherwise herein to the contrary, references to a signal herein mean any processed or unprocessed version of the signal. That is, specific processing steps discussed and/or claimed herein are not intended to be exclusive; rather, intermediate processing may be performed between any two processing steps expressly discussed or claimed herein, except to the extent expressly stated otherwise.

As used herein, the term "attached", or any other form of the word, without further modification, is intended to mean directly attached, attached through one or more other intermediate elements or components, or integrally formed together. In the drawings and/or the discussion, where two individual components or elements are shown and/or discussed as being directly attached to each other, such attachments should be understood as being merely exemplary, and in alternate embodiments the attachment instead may include additional components or elements between such two components. Similarly, method steps discussed and/or claimed herein are not intended to be exclusive; rather, intermediate steps may be performed between any two steps expressly discussed or claimed herein.

Whenever a specific value is mentioned herein, such a reference is intended to include that specific value or substantially or approximately that value. In this regard, the foregoing use of the word "substantially" is intended to encompass values that are not substantially different from the stated value, i.e., permitting deviations that would not have substantial impact within the identified context. For example, stating that a continuously variable signal level is set to a particular value should be understood to include values within a range around such specifically stated value that produce substantially the same effect as the specifically stated value. For example, the identification of a single length, width, depth, thickness, etc. should be understood to include values within a range around such specifically stated value that produce substantially the same effect as the specifically stated value. As used herein, except to the extent expressly and specifically stated otherwise, the term "approximately" can mean, e.g.: within ±10% of the stated value or within ±20% of the stated value.

In the preceding discussion, the terms "operators", "operations", "functions" and similar terms refer to method or process steps or to hardware components, depending upon the particular implementation/embodiment.

Unless clearly indicated to the contrary, words such as "optimal", "optimize", "maximize", "minimize", "best", as well as similar words and other words and suffixes denoting comparison, in the above discussion are not used in their absolute sense. Instead, such terms ordinarily are intended to be understood in light of any other potential constraints, such as user-specified constraints and objectives, as well as cost and processing or manufacturing constraints.

In the above discussion, certain methods are explained by breaking them down into steps listed in a particular order. Similarly, certain processing is performed by showing and/or describing modules arranged in a certain order. However, it should be noted that in each such case, except to the extent clearly indicated to the contrary or mandated by practical considerations (such as where the results from one step are necessary to perform another), the indicated order is not critical but, instead, that the described steps and/or modules can be reordered and/or two or more of such steps (or the processing within two or more of such modules) can be performed concurrently.

References herein to a "criterion", "multiple criteria", "condition", "conditions" or similar words which are intended to trigger, limit, filter or otherwise affect processing steps, other actions, the subjects of processing steps or actions, or any other activity or data, are intended to mean "one or more", irrespective of whether the singular or the plural form has been used. For instance, any criterion or condition can include any combination (e.g., Boolean combination) of actions, events and/or occurrences (i.e., a multi-part criterion or condition).

Similarly, in the discussion above, functionality sometimes is ascribed to a particular module or component. However, functionality generally may be redistributed as desired among any different modules or components, in some cases completely obviating the need for a particular component or module and/or requiring the addition of new components or modules. The precise distribution of functionality preferably is made according to known engineering tradeoffs, with reference to the specific embodiment of the invention, as will be understood by those skilled in the art.

As used herein, the words "include", "includes", "including", and all other forms of the word should not be understood as limiting, but rather any specific items following such words should be understood as being merely exemplary.

Several different embodiments of the present invention are described above and/or in any documents incorporated by reference herein, with each such embodiment described as including certain features. However, it is intended that the features described in connection with the discussion of any single embodiment are not limited to that embodiment but may be included and/or arranged in various combinations in any of the other embodiments as well, as will be understood by those skilled in the art.

Thus, although the present invention has been described in detail with regard to the exemplary embodiments thereof and accompanying drawings, it should be apparent to those skilled in the art that various adaptations and modifications of the present invention may be accomplished without departing from the intent and the scope of the invention. Accordingly, the invention is not limited to the precise embodiments shown in the drawings and described above. Rather, it is intended that all such variations not departing from the intent of the invention are to be considered as within the scope thereof, as limited solely by the claims appended hereto.

What is claimed is:

1. A safety power management system, comprising:

a main digital control unit configured to control a system power supply;

a digital machine supervisor configured to execute a handshake procedure in which it: (a) sends handshake requests to the main digital control unit at predetermined times, (b) waits for a response signal from the main digital control unit to each of the handshake requests, (c) performs a verification process on the response signal if the response signal is received within an expected timeframe, and (d) outputs a DMS safety signal if the response signal is not received within the expected timeframe or if the verification process fails, wherein the main digital control unit is configured to generate and provide the response signal in response to each of the handshake requests, and wherein the main digital control unit is configured to output a DCU safety signal if one of the handshake requests is not received at any one of the predetermined times.

2. A safety power management system according to claim 1, wherein the digital machine supervisor executes the handshake procedure based on a first clock signal, and the main digital control unit executes a process to respond to the handshake requests based on a second clock signal that is independent of the first clock signal.

3. A safety power management system according to claim 1, wherein the digital machine supervisor is powered by a first power supply, and the main digital control unit is powered by a second power supply that is independent of the first power supply.

4. A safety power management system according to claim 3, further comprising a separate monitoring unit, configured to monitor operations of the second power supply.

5. A safety power management system according to claim 4, wherein the separate monitoring unit provides notifications directly to the digital machine supervisor.

6. A safety power management system according to claim 4, wherein the separate monitoring unit comprises an over-voltage monitor.

7. A safety power management system according to claim 1, wherein the system power supply supplies electrical power to an automotive system.

8. A safety power management system according to claim 7, wherein each of the digital machine supervisor and the main digital control unit can instigate the transmission of a system safety output signal to a component of the automotive system.

9. A safety power management system according to claim 8, wherein the system safety output signal is a fail-safe notification.

10. A safety power management system according to claim 8, wherein the system safety output signal is a hard reset signal.

11. A safety power management system according to claim 1, wherein the digital machine supervisor has an output coupled to the system power supply and is configured to directly disable the system power supply upon occurrence of a critical system failure.

12. A safety power management system according to claim 1, wherein each of the handshake requests comprises a randomly generated code.

13. A safety power management system according to claim 1, wherein prior to execution of the handshake procedure, the main digital control unit provides the digital machine supervisor with a reference code representing values of control signals intended to be used by the main digital control unit.

14. A safety power management system according to claim 13, wherein the main digital control unit generates the response signal in response to each of the handshake requests based on then-current values of the control signals being used by the main digital control unit.

15. A safety power management system according to claim 14, wherein the verification process identifies whether any of the then-current values of the control signals are different than the values of the control signals intended to be used by the main digital control unit.

16. A safety power management system according to claim 1, wherein the response signal comprises a cyclic redundancy code based on (i) the then-current values of the control signals being used by the main digital control unit and (ii) a code within the current handshake request received from the digital machine supervisor.

17. A safety power management system according to claim 1, wherein the predetermined times are periodic instances, each occurring a uniform time interval after the preceding instance.

18. A safety power management system according to claim 17, wherein the expected timeframe is a specified window after each of the preceding instances.

19. A safety power management system according to claim 1, further comprising a bandgap monitor that is configured to detect drift between a first bandgap reference output by the main digital control unit and used for voltage generation and a second bandgap reference output by the main digital control unit and used for voltage monitoring.

20. A method of safety power management with a main digital control unit and a separate digital machine supervisor, comprising:

the main digital control unit controls a system power supply;

the digital machine supervisor executes a handshake procedure in which the digital machine supervisor: (a) sends handshake requests to the main digital control unit at predetermined times, (b) waits for a response signal from the main digital control unit to each of the handshake requests, (c) performs a verification process on the response signal if the response signal is received within an expected timeframe, and (d) outputs a DMS safety signal if the response signal is not received within the expected timeframe or if the verification process fails; and the main digital control unit generates and provides the response signal in response to each of the handshake requests and outputs a DCU safety signal if one of the handshake requests is not received at any one of the predetermined times.

* * * * *